(12) United States Patent
Fukuda et al.

(10) Patent No.: US 6,586,132 B1
(45) Date of Patent: Jul. 1, 2003

(54) SEALED BATTERY PACK (75) Inventors: Shinsuke Fukuda, Toyohashi (JP);
Yoshiaki Ogata, Toyohashi (JP);
Mitsugu Takaki, Toyohashi (JP);
Yasunori Uchida, Aichi (JP); Joji
Kasugai, Aichi (JP)

(73) Assignees: Matsushita Electric Industrial Co.,
Ltd., Osaka (JP); Toyota Jidosha
Kabushiki Kaisha, Aichi (JP); Toyoda
Gosei Co., Ltd., Aichi (JP)

(*) Notice: Subject to any disclaimer, the term of this
patent is extended or adjusted under 35
U.S.C. 154(b) by 0 days.

(21) Appl. No.: 09/670,525

(22) Filed: Sep. 26, 2000

Related U.S. Application Data (63) Continuation-in-part of application No. 09/516,556, filed on Feb. 29, 2000, now Pat. No. 6,482,542.

(30) Foreign Application Priority Data

Mar. 3, 1999 (JP) .......................... 11-055612
Mar. 3, 1999 (JP) .......................... 11-055614
Sep. 28, 1999 (JP) .......................... 11-274309

(51) Int. Cl.$^7$ .......................... H01M 2/02; H01M 2/04; H01M 2/10; H01M 10/50
(52) U.S. Cl. .......................... 429/120; 429/72; 429/148; 429/159; 429/175; 429/176; 429/177
(58) Field of Search .......................... 429/72, 99, 120, 429/148, 159, 175, 176, 177

(56) References Cited

U.S. PATENT DOCUMENTS

| | | | |
|---|---|---|---|
| 5,585,204 A | 12/1996 | Oshida et al. | 429/62 |
| 5,641,589 A | 6/1997 | Grivel et al. | 429/120 |
| 6,066,411 A | * 5/2000 | Liu | 429/82 |
| 6,482,542 B1 | * 11/2002 | Takaki et al. | 429/120 |

FOREIGN PATENT DOCUMENTS

| | | |
|---|---|---|
| DE | 19504687 | 3/1996 |
| EP | 0644604 | 3/1995 |
| EP | 1033772 | 9/2000 |
| JP | 61-45571 | 3/1986 |
| JP | 6-215804 | 8/1994 |
| JP | 7-85847 | 3/1995 |

* cited by examiner

Primary Examiner—Randy Gulakowski
Assistant Examiner—Jonathan Crepeau
(74) Attorney, Agent, or Firm—Jordan and Hamburg LLP

(57) ABSTRACT

In a sealed battery pack comprising a plurality of serially disposed cells in which power generating elements are housed in prismatic cell cases and the openings thereof are sealed, the plurality of serially disposed cells are housed in a cooling box, and the top openings in the cooling box and the openings in the various cell cases of the cells are sealed by integrating lids. Coolant passages on both sides between the side surfaces of the cells and the side walls on both sides of the cooling box in the cell arrangement direction, and coolant passages between the cases of the cells are formed so as to communicate with each other, so that all of the side surfaces of the cells are forcibly cooled by a coolant.

3 Claims, 15 Drawing Sheets

SEALED BATTERY PACK

This application is a continuation in part application of Ser. No. 09/516,556, filed on Feb. 29, 2000, now U.S. Pat. No. 6,482,542.

BACKGROUND OF THE INVENTION

1. Field of the Invention

The present invention relates to a sealed battery pack in which a plurality of cells are disposed in series into an integrated battery case.

2. Description of the Related Art

Figure 16:
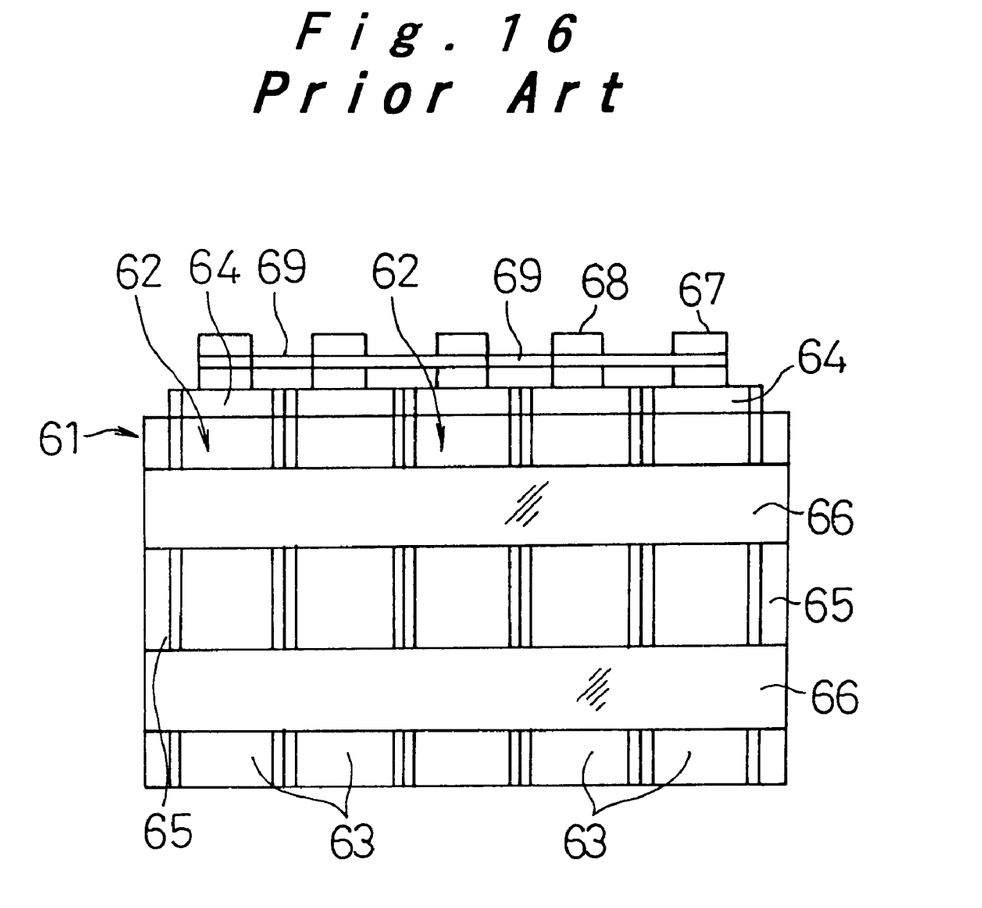
FIG. 16 is a front view of a conventional sealed battery pack.

A sealed battery pack of this type is disclosed in Japanese Laid-Open Patent Application H7-85847. As shown in FIG. 16, this sealed battery pack 61 is structured such that elements for electromotive force are housed in cases 63 formed in a bottomed, prismatic shape, the openings in the cases 63 are sealed with lids 64, a plurality of the resulting cells 62 are disposed in series, and the cases 63 of these cells 62 are bound together with end plates 65 and restricting bands 66. The positive electrode terminals 67 and negative electrode terminals 68 of the cells 62 protrude upward through the lids 64, and these terminals 67 and 68 are successively connected in series by an electrical connecting bar 69.

Japanese Laid-Open Patent Application H6-215804 discloses a mono-block rechargeable battery in which plastic cell cases and lids are welded, wherein a cooling jacket is provided between the side plates and the side walls of the cases by welding the side plates, which have recessed spaces formed on their insides, to the outer surfaces of the two opposing side walls of the cases, and cooling liquid inlet orifices and outlet orifices are provided to the upper part of the two ends of the side plates.

Japanese Laid-Open Patent Application S61-45571 discloses that cooling passages are provided above and below through the cell separators of a mono-block case, headers are provided above and below for allowing a coolant to flow in and out, and a separate lid is provided for every cell.

However, with the sealed battery pack of Japanese Laid-Open Patent Application H7-85847, because the cells were disposed in close contact and bound together, not enough heat was radiated away from the cells when the ambient temperature was high or when the battery was charged or discharged at a high current. This not only raised the battery temperature and shortened the battery service life, but could potentially lead to damage of the battery case if the temperature further rose up to the heat resistance temperature of the synthetic resin from which the battery case was made.

In contrast, with the rechargeable battery in Japanese Laid-Open Patent Application H6-215804, temperature increases could be suppressed to a certain extent because the sides of the cell case were cooled by the cooling jacket, but with a rechargeable battery comprising a group of cells as shown in FIG. 16, increases in the temperature of the cells could not be adequately controlled because there was no cooling between the cells. Also, since the cooling jacket was produced by welding side plates to the cell case, a rechargeable battery comprising a group of cells in particular entailed numerous welding steps and was therefore complicated, and another problem was ensuring a good seal for the coolant.

With the rechargeable battery in Japanese Laid-Open Patent Application S61-45571, the portion forming the cooling passages above and below in the cell separators in the mono-block case was forcibly cooled, but the cooling effect was inadequate because the entire outer surface of each cell was not forcibly cooled. The complexity of the case structure also drove up the manufacturing cost, and since a lid had to be provided for every cell, assembly took longer and added to the cost, among other problems.

SUMMARY OF THE INVENTION

The present invention was conceived in light of the above problems, and it is an object thereof to provide a sealed battery pack with which the cells can be effectively cooled with an inexpensive structure, and good sealing can be ensured with a simple sealing and joining process.

The sealed battery pack of the present invention comprises a plurality of serially disposed cells in which power generating elements are housed in bottomed, prismatic cell cases and the openings thereof are sealed, wherein the plurality of serially disposed cells are housed in a cooling box, the top openings in the cooling box and the openings in the various cell cases are sealed by an integrating lid, and coolant passages are formed by causing the various cell cases to communicate with each other between the sides of the cells and the inner walls on both sides of the cooling box in the direction in which the cells are disposed. Because all of the sides of the cells, including those between the cells, can be forcibly cooled with a coolant that flows through coolant passages, all of the cells can be effectively cooled and higher performance can be ensured. Also, because a plurality of serially disposed cells are housed within a cooling box, a coolant passage with a good seal can be formed merely by sealing the tops of the cells with an integrating lid, coolant passages can be formed with a simple sealing and joining process in just the vertical direction with a small number of parts, and a sealed battery pack with high reliability and performance can be obtained inexpensively with less assembly work.

The structure may also be such that the lid comprises a middle lid which is joined at the bottom to the upper ends of the cooling box and the various cell cases, consists of a ladder-like framework that separately partitions the openings in the various cell cases, and is provided with a connector for electrically connecting adjacent cells, and an outer lid joined to the top of the middle lid. In this case, a sealed battery pack can be easily manufactured by joining the middle lid to the tops of the cases and the cooling box and connecting the connectors and power generating elements of the various cells, and then joining the outer lid over this. A coolant passage can also be formed by joining the cases to the cooling box and the middle lid, which eliminates the need for sealing with respect to the coolant in the connector portion, and ensures a highly reliable electrical connection with a simple structure.

If the cell cases, lid, and cooling box are made of a synthetic resin and integrated by being joined together by welding, a rechargeable battery in which the cells are integrally grouped in a case can be manufactured with good productivity by simple welding in just the vertical direction.

If latching members are provided within the coolant passages between cell cases at a suitable distance in the cell disposition direction from the side walls of the cooling box on both sides in the cell disposition direction, and protrusions that engage with the latching members are provided to the side walls of the cell cases, the engagement of the protrusions and the latching members will prevent the displacement of the cooling box outside of the side walls. Even if the two side walls of the cooling box are not welded to the cell cases, there will be enough strength to prevent the side walls of the cooling box from being distended by the internal pressure of the coolant passages on both sides.

If the latching members are formed protruding upward from the corners of step-like partitions cut out in the shape of steps on both sides and leading upward, the latching members can be engaged without interfering with the protrusions disposed at a plurality of places above and below merely by inserting the serially disposed cells in the cooling box from above. Furthermore, the latching members can be provided by integrally molding the step-like partitions in the cooling box, and since the cooling box can be removed from the mold in a single direction, this structure affords easier molding and less expensive manufacture.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 11 illustrates the cooling box in the same embodiment, with FIG. 11A being a detail plan view and FIG. 11B a vertical cross section from the front;

FIG. 15 illustrates the flow of the coolant in the same embodiment, with FIG. 15A being a diagram of the flow seen from the front, and FIG. 15B a diagram of the flow [in a cross section] along the XVB—XVB line in FIG. 15A.

DESCRIPTION OF THE PREFERRED EMBODIMENTS

An embodiment of the sealed battery pack of the present invention will now be described through reference to FIGS. 1 to 9.

Figure 1:
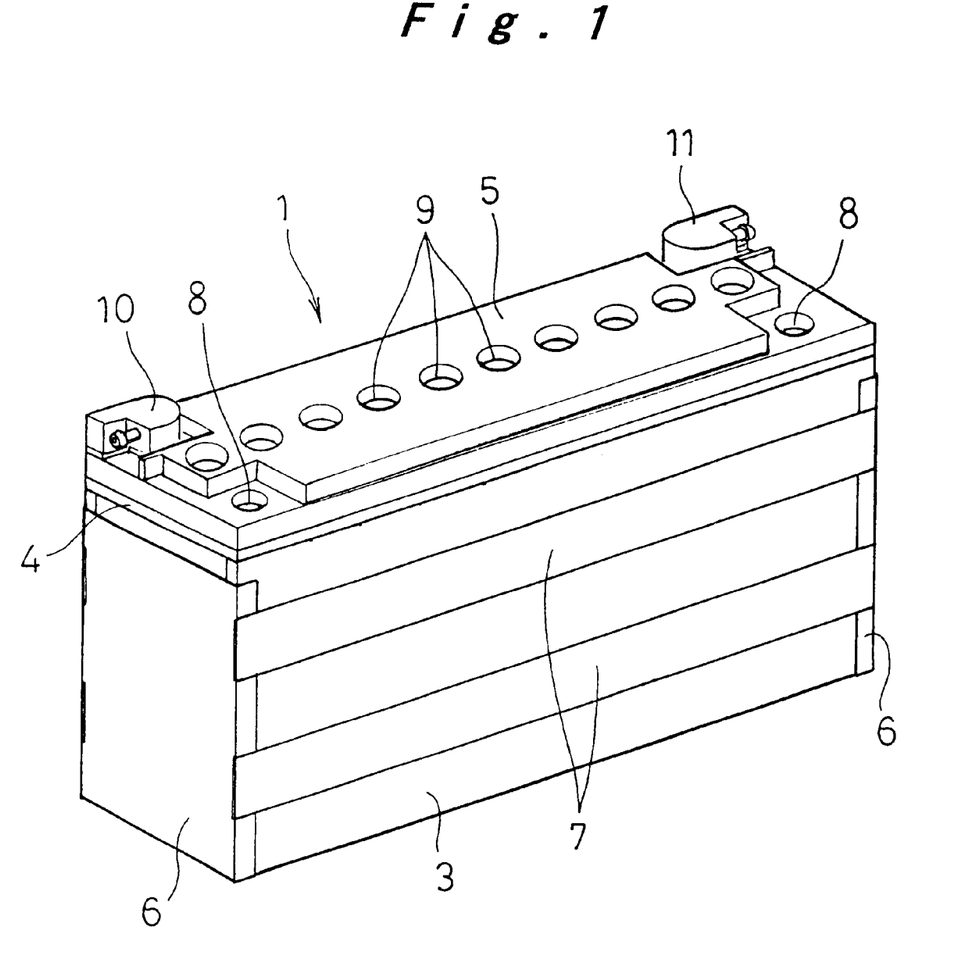
FIG. 1 is an exterior oblique view of an embodiment of the sealed battery pack of the present invention.
Figure 2:
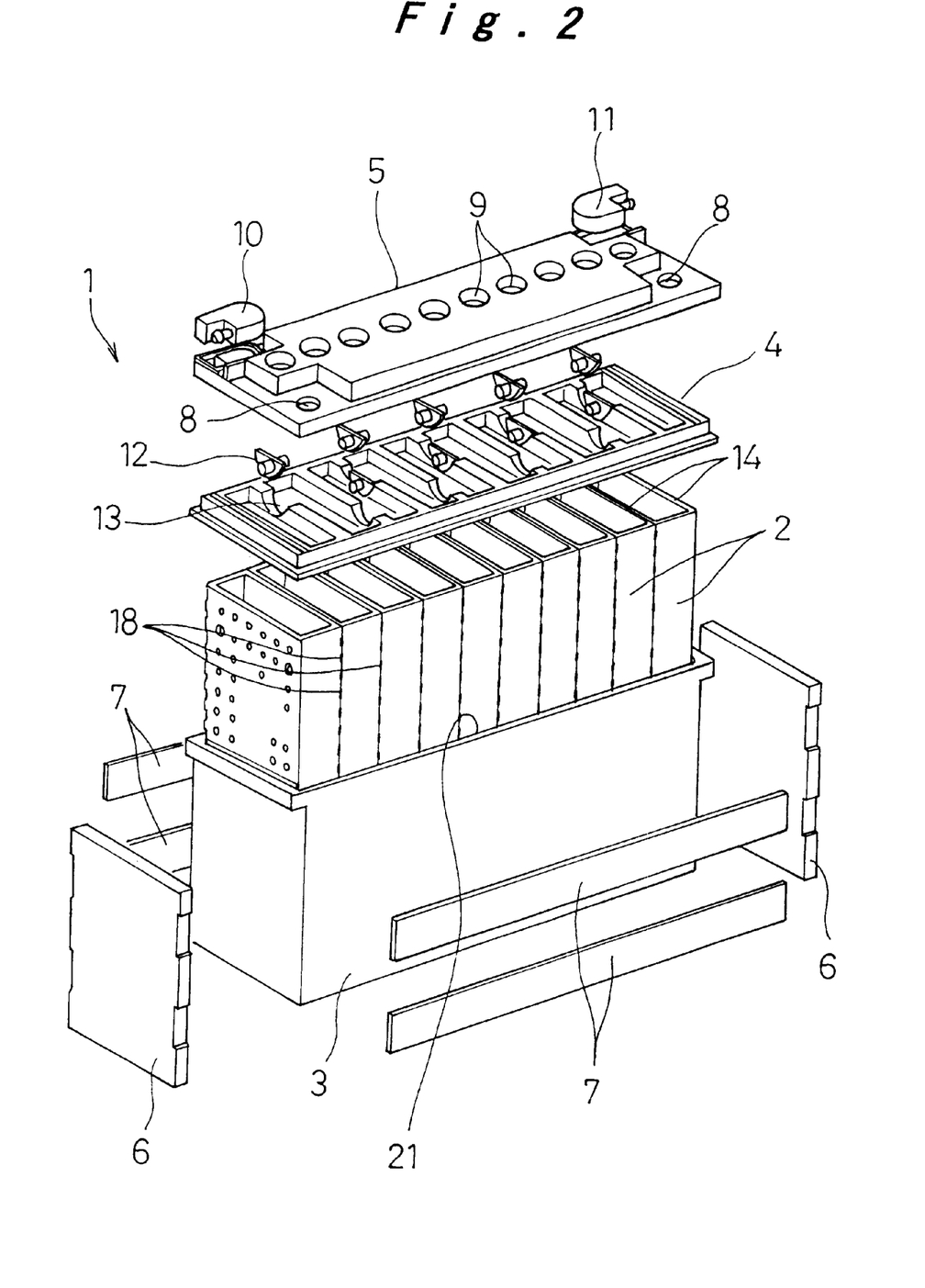
FIG. 2 is an exploded oblique view of the same embodiment.
Figure 3:
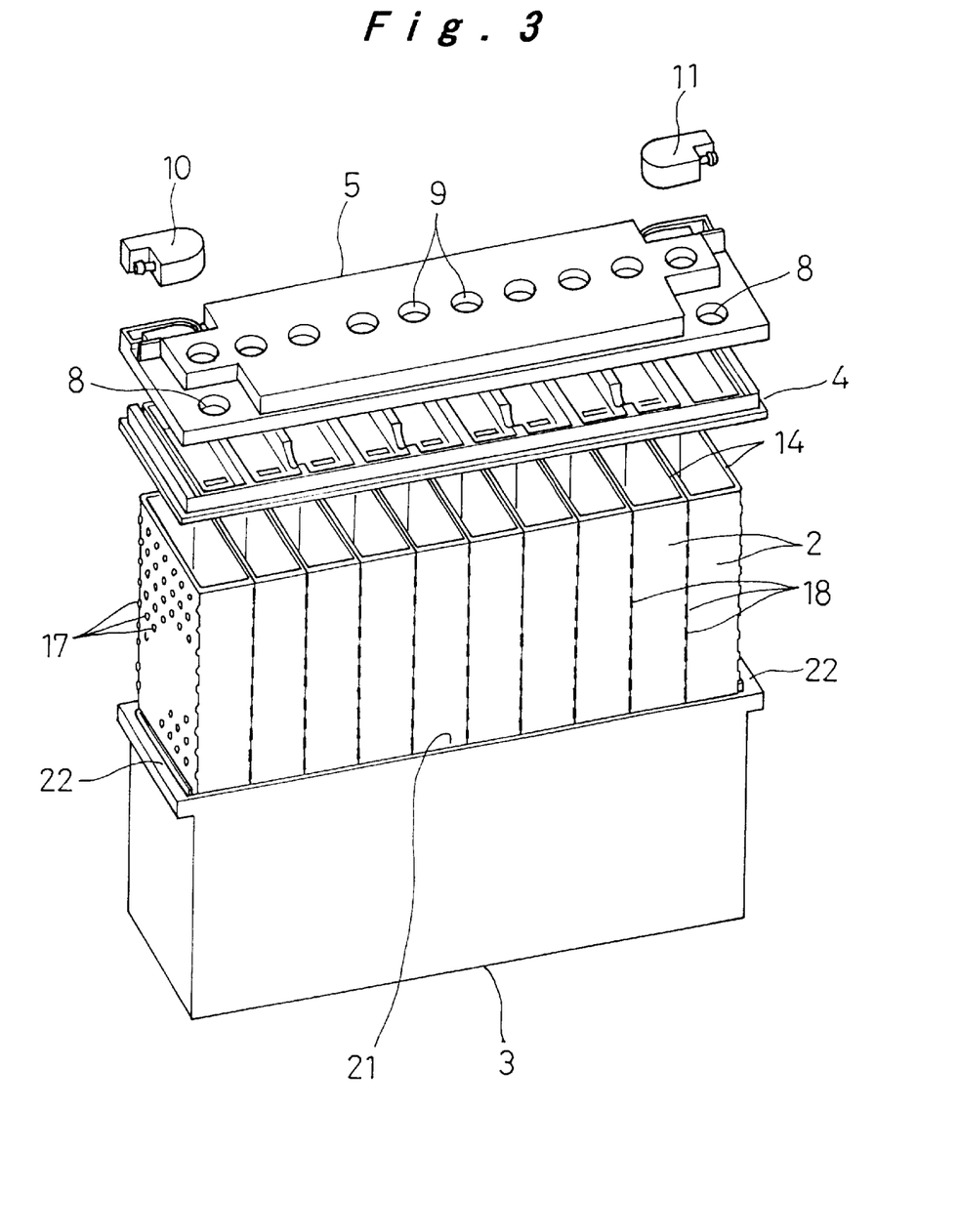
FIG. 3 is an exploded oblique view of the main components in the same embodiment.

The sealed battery pack 1 in this embodiment is a nickel metal hydride battery, which can be used to advantage as a drive power source for an electric vehicle. As shown in FIGS. 1 to 3, a plurality of cells 2 are disposed in series and joined to one another into an integrated case, which is housed in a cooling box 3. A middle lid 4 (a single piece) is joined to the openings of the cells 2, over which an outer lid 5 (also a single piece) is joined to seal the cells 2. End plates 6 are placed at both ends of the cooling box 3, and the end plates 6 are bound together with restricting bands 7. Numeral 8 indicates terminal mounting holes formed in the outer lid 5, through which are passed a positive electrode terminal and negative electrode terminal protruding above the cells 2 at one end and the other end. Numeral 9 indicates safety vent mounting holes made in the outer lid 5 corresponding to the cells 2. Numerals 10 and 11 are the coolant inlet orifice and outlet orifice, respectively, which are integrally mounted at the two ends of the outer lid 5.

In FIG. 2, numeral 12 indicates connectors that electrically connect adjacent cells 2 and are disposed in triangular notches 13 formed in the middle lid 4, integrally joined in a sealed state by the middle lid 4 and the outer lid 5. The cases of the cells 2, the cooling box 3, the middle lid 4, the outer lid 5, the inlet orifice 10, the outlet orifice 11, and so forth are made of a synthetic resin such as a PP/PPE alloy, and are integrally joined together by welding.

Figure 4:
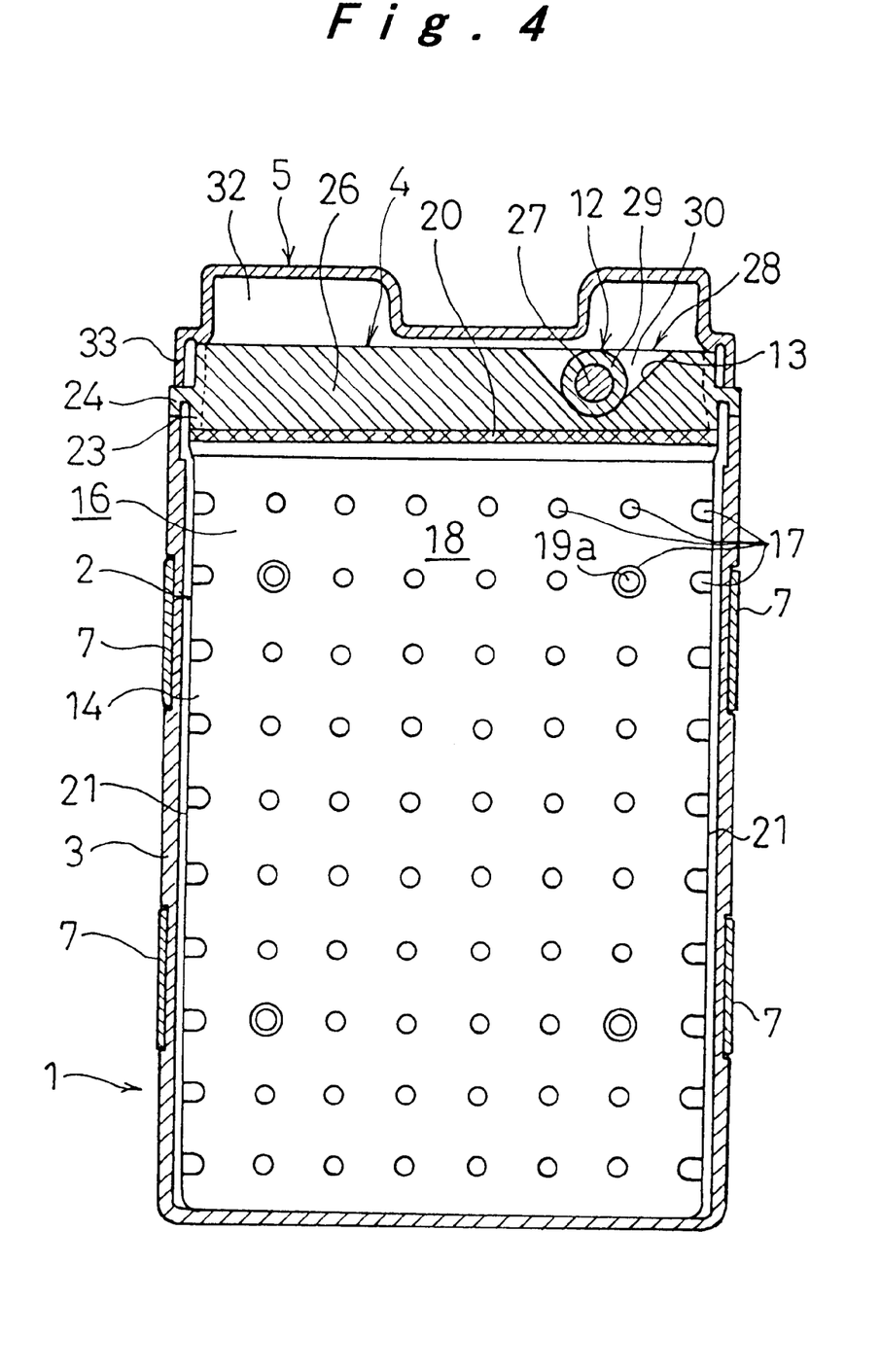
FIG. 4 is a vertical cross section of the same embodiment.
Figure 5:
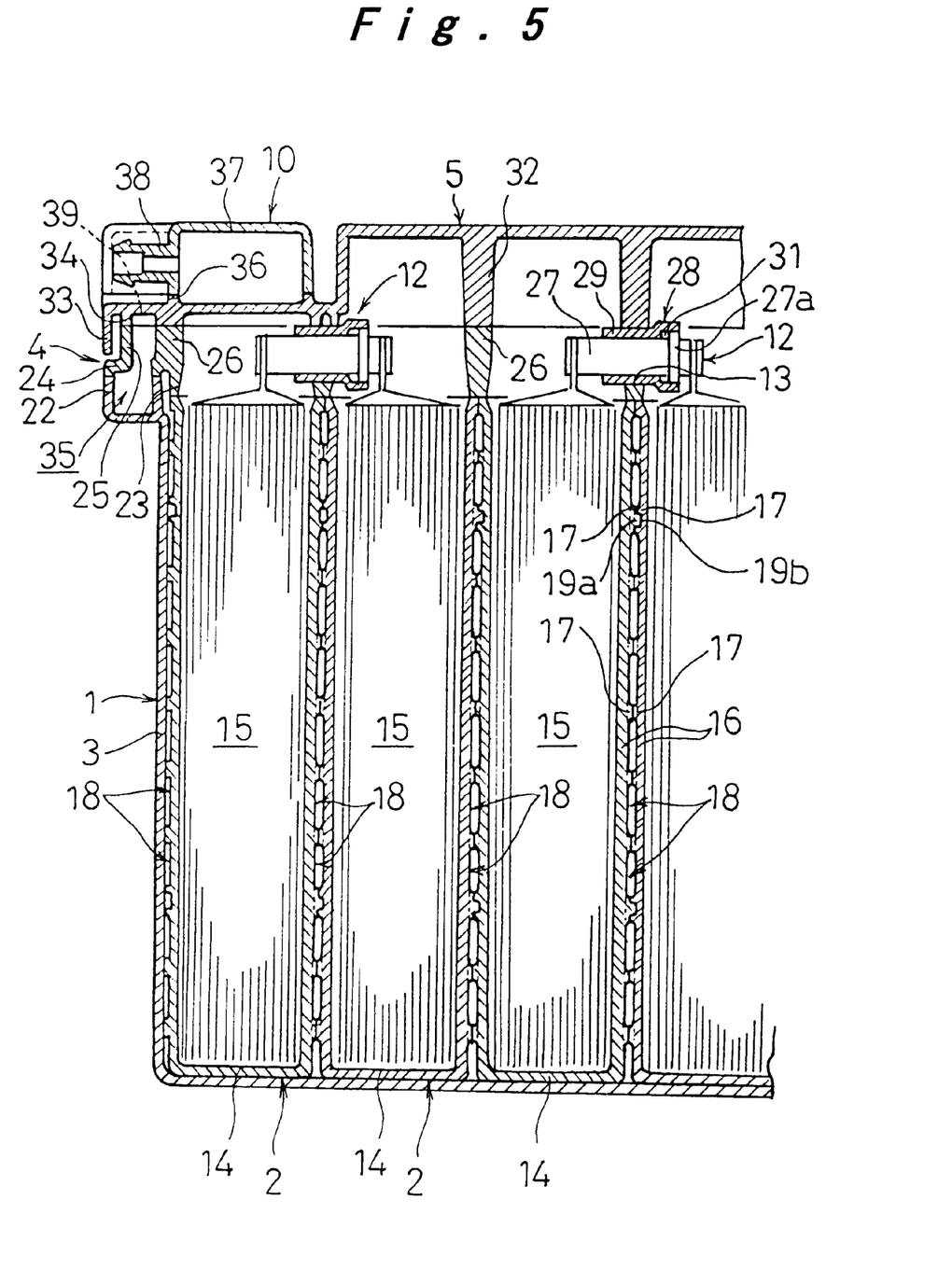
FIG. 5 is a detail vertical cross section of the same embodiment.

To describe this in further detail, as shown in FIGS. 4 and 5, the cells 2 comprise elements for electromotive force 15 housed in bottomed, prismatic cases 14. Numerous protrusions 17 that touch each other when the cells 2 are arranged in series are arranged in a matrix form, protruding from the opposing walls 16 of the mutually opposing cases 14. The spaces formed between these protrusions 17 that are in contact between the opposing walls 16 become coolant passages 18 between the cases. A plurality of (four in the illustrated example) protrusions 17 are formed in a large diameter at suitable places, and engaging protrusions 19a and engaging depressions 19b that fit into and engage with each other are formed on the ends of these protrusions 17 and are used for positioning the cases 14. Joining edges 20 that are in contact with each other protrude from the top edges of the cases 14. With the cells 2 arranged in series, the mutually touching protrusions 17 and joining edges 20 are welded together to integrally join the cells 2 into an integrated case.

This group of cells 2 is housed in the cooling box 3, and coolant passages 21 are formed on both sides in the arrangement direction of the cells 2 by the spaces formed between the cells 2 and the side walls of the cooling box 3. Troughs 22 that form distribution headers and communicate with the cooling medium passages 21 on both sides for distributing cooling medium (water) are formed at the upper edges of both ends of the cooling box 3 in the lengthwise direction (the cell arrangement direction).

Figure 6:
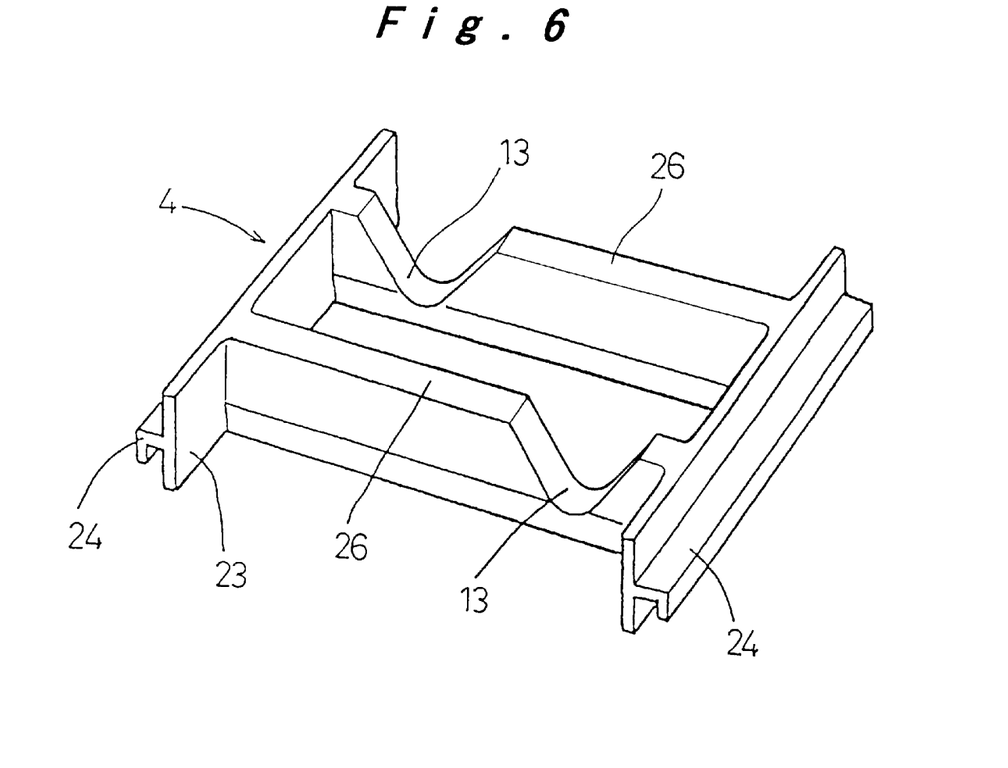
FIG. 6 is a detail oblique view of the middle lid in the same embodiment.

As shown in FIGS. 4, 5, and 6, the middle lid 4 consists of a ladder-like framework, comprising inner frames 23 whose bottom edges are joined to the top edges of the cases 14 of the cells 2 made into an integrated case, joining flanges 24 protruding in an inverted L-shape (cross section) around the outside of the inner frames 23, the bottom edges of which are joined to the side wall top edges of the cooling box 3, and header frames 25 formed at both ends in the lengthwise direction so as to be joined to the top edges of the distributing header-forming troughs 22 of the cooling box 3. Numeral 26 indicates lateral braces of the inner frames 23, and these correspond to the spaces between the cases 14 of the cells 2. Substantially triangular notches 13 in which connectors 12 that electrically connect adjacent cells 2 are disposed and joined are formed in a zigzag pattern at the tops of these lateral braces 26.

Figure 7:
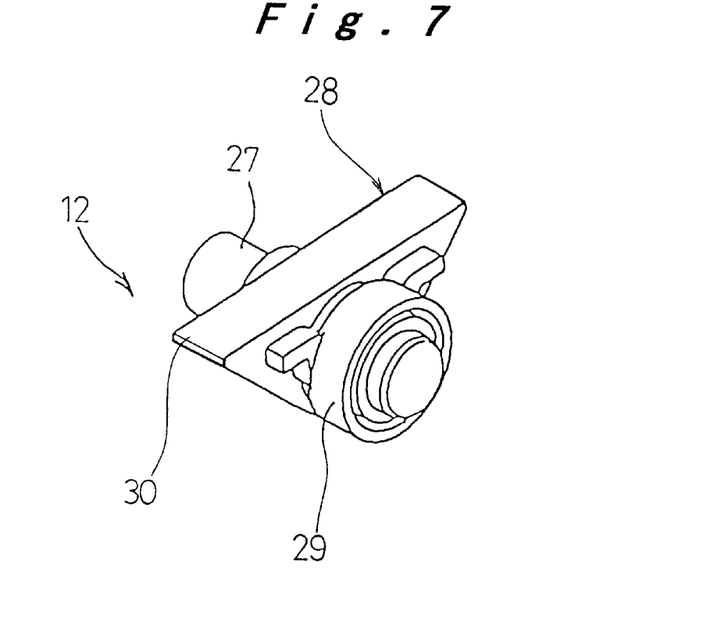
FIG. 7 is an oblique view of the electrical connector in the same embodiment.

As shown in FIGS. 4, 5, and 7, the connectors 12 consist of connecting shafts 27 made of a metal (such as nickel) and support elements 28 made of a synthetic resin. The connecting shafts 27 are press-fitted into and pass through holding tubes 29 of the support elements 28, and a perfect seal is achieved by O-rings 31 interposed between flanges 27a of the connecting shafts 27 and the inner peripheries of the holding tubes 29. Triangular lugs 30 protruding from the holding tubes 29 are provided to the support elements 28, and are designed so that these connectors 12 are joined to the lateral braces 26 when disposed in the notches 13.

Figure 8:
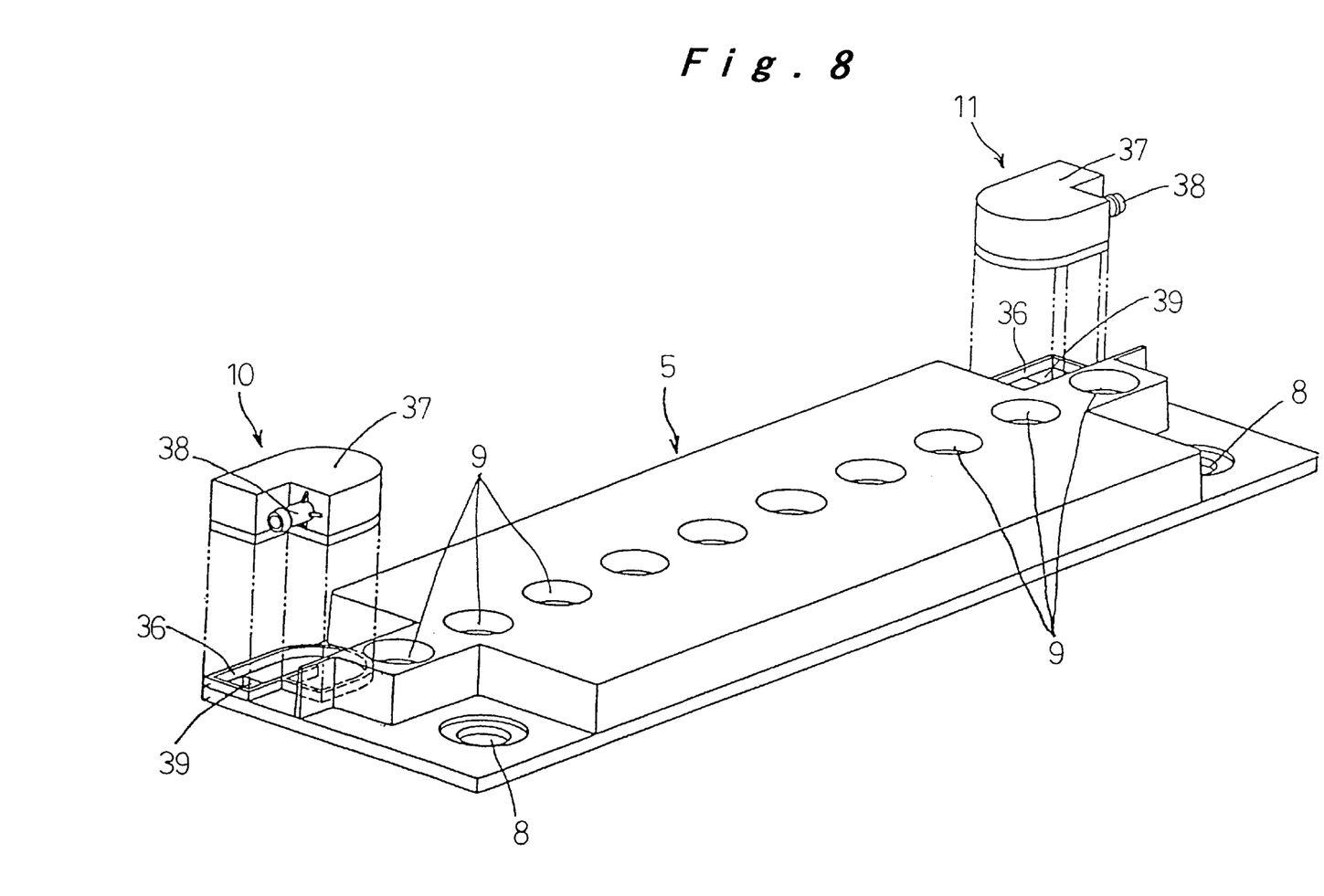
FIG. 8 is an oblique view of the outer lid in the same embodiment.

As shown in FIGS. 4, 5, and 8, the outer lid 5 has individual frames 32 formed on its inner surface corresponding to the inner frames 23 of the middle lid 4, and from the outer periphery of the outer lid 5 are suspended inverted L-shaped (cross section) joining flanges 33 whose lower ends are joined to the outer top ends of the joining flanges 24 of the middle lid 4. Sealing ribs 34 that are joined to the top ends of the header frames 25 and seal off and form distributing headers 35 protrude at both ends in the lengthwise direction.

The terminal mounting holes 8 are formed to one side at both ends of the outer lid 5, and joining ribs 36 that join the inlet orifice 10 and the outlet orifice 11 are provided protruding on the other side. These orifices 10 and 11 are substantially J-shaped in plan view, and have connection ports 38 protruding from the distal ends on the short sides of J-box pieces 37 that are open on the bottom side. Communicating openings 39 that communicate with the distributing headers 35 are formed at the portions of the outer lid 5 across from the long-side distal ends of the J-box pieces 37.

Figure 9A:
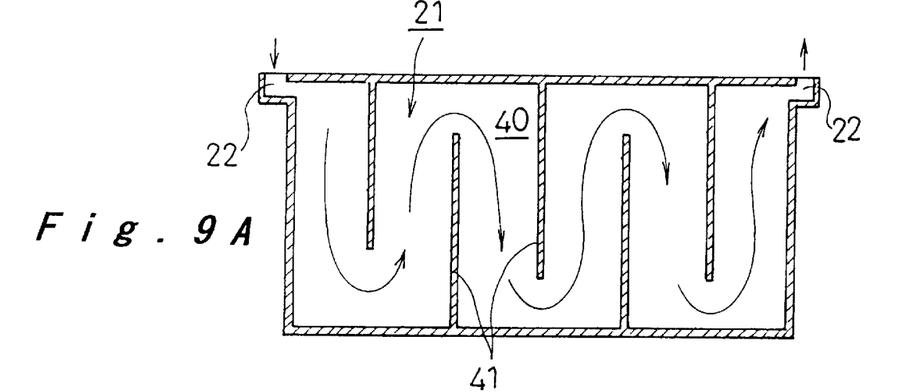
FIG. 9 consists of vertical cross sections illustrating various examples of the structure inside the coolant passages on both sides in the same embodiment.
Figure 9B:
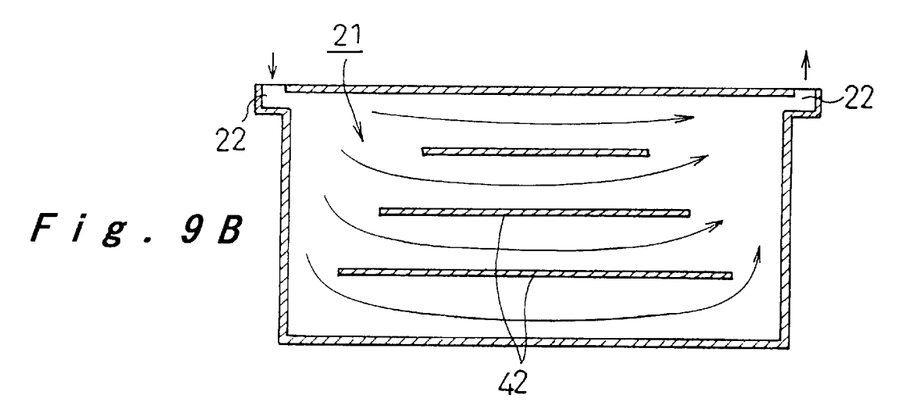
Figure 9C:
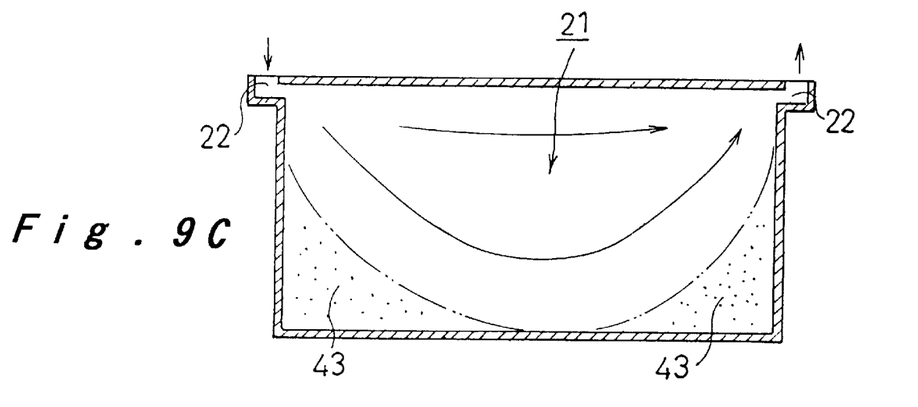

As shown in FIG. 9A, flow-alignment ribs 41 that form meandering flow passages 40 that meander up and down are formed on the inner surfaces of the walls on both sides of the cooling box 3 so that the coolant will flow uniformly over the entire surface of the coolant passages 21 on both sides. As shown in FIG. 9B, a plurality of horizontal flow-alignment ribs 42 that are shorter at the top and longer at the bottom and that are suitably spaced apart vertically may be provided instead of these flow-alignment ribs 41. These flow-alignment ribs 41 or 42 do not necessarily have to be provided, but if they are not, as shown in FIG. 9C, there is the possibility that there will be a coolant stagnation zone 43 at the lower part on both sides of the coolant passages 21, and the lower part of the cells 2 will not be sufficiently cooled at the ends in the arrangement direction, so it is preferable for the flow-alignment ribs 41 or 42 to be provided. The flow-alignment ribs 41 or 42 may also be provided on the case 14 side of the cells 2.

With the sealed battery pack 1 structured as above, when the coolant is supplied from the inlet orifice 10, it goes through the distributing headers 35 and flows into the coolant passages 21 on both sides, then flows downstream through these coolant passages 21, and flows through the coolant passages 18 between the cases 14 of the cells 2. Both sides of the cases 14 of the cells 2, including the opposing wall surfaces 16, are forcibly cooled by the coolant, and the coolant is then discharged from the outlet orifice 11. Therefore, all four sides of the cells 2 are effectively cooled by the coolant.

The coolant flows through the coolant passages 18 between the cases as part of coolant flows between the coolant passages 21 on both sides, or as branch flows branched from the coolant that flows up and down in the flow-alignment passages 40 of the coolant passages 21 on both sides.

With the above structure, the cells 2 are welded and integrally joined together to create an integrated battery case, which is inserted into the cooling box 3 and sealed simply by welding the integrating middle lid 4 and outer lid 5 in the vertical direction at the openings to the cases 14 of the cells 2 and the cooling box 3, so the sealed battery pack 1 can be obtained as an integrated battery case with fewer parts and less assembly work. Also, since a plurality of cells 2 are grouped in an integrated battery case and housed in the cooling box 3 so as to form coolant passages 21 on both sides of the inner wall surfaces of the cooling box 3 and the coolant passages 18 between the cases, it is easier to form coolant passages 18 and 21 that are highly reliable and pose no danger of coolant leakage, affording a reduction in assembly work.

Since the protrusions 17 are formed on the opposing wall surfaces 16 of the cases 14 of the cells 2, and these protrusions 17 are butted together and welded, the coolant passages 18 can be formed over substantially the entire surface between the opposing wall surfaces 16 easily and inexpensively.

Since the coolant inlet orifice 10 and outlet orifice 11 through which coolant is supplied and discharged to and from the coolant passages 21 on both sides are disposed at both ends in the cell arrangement direction and connected to the coolant passages 21 on both sides via the distributing headers 35, the entire periphery of all the cells 2 can be effectively cooled with a simple coolant path in conjunction with the above structure.

Next, another embodiment of the sealed battery pack of the present invention will be described through reference to FIGS. 10 to 15. In the above embodiment, the flow-alignment ribs 41 and 42 were formed on the inner surfaces of the walls on both sides of the cooling box 3, but in this embodiment, step-like partitions 51 are formed on the bottom and on both side walls of the cooling box 3 with respect to the cell arrangement direction. The step-like partitions 51 are located in the spaces between the cases 14, function as flow-alignment ribs for forming the meandering flow passages 40, and open widely upward and to both sides in staircase-fashion so as to form the coolant passages 18 between the cases in the interior.

Latching members 52 are formed protruding upward at the corners of these step-like partitions 51, while vertical engagement protrusions 53 are provided to the opposing wall surfaces 16 of the cases 14 so as to fit into and engage with the latching members 52. The thickness of the step-like partitions 51 is set to be substantially the same as the spacing between the cases 14 so as to form the coolant passages 18 between the cases in the interior, and the amount the engagement protrusions 53 protrude is approximately one-half this thickness.

As shown in FIGS. 10 to 13, the meandering flow passages 40 which constitute the coolant passages 21 on both sides are formed on both sides of the step-like partitions 51, so fluid passage cut-outs 54 and fluid passage openings 55 are alternately formed at the top and lower portion. Branched flow passages 56 for diverting the flow of the coolant from the fluid passage openings 55 toward the coolant passages 18 between the cases are formed as cut-outs, and re-circulation passages 57 are formed as cut-outs at the top of the step-like partitions 51 in which the fluid passage openings 55 are formed, so that the coolant flowing up through the coolant passages 18 will be re-circulated to the top of the meandering flow passages 40. Re-circulating passages 58 are formed as cut-outs at the lower portion on both sides of the step-like partitions 51 in which the fluid passage cut-outs 54 are formed, so that the coolant that has been diverted from the fluid passage cut-outs 54 toward the coolant passages 18 between the cases and flowed down through the coolant passages 18 will be re-circulated to the lower ends of the meandering flow passages 40.

Figure 10:
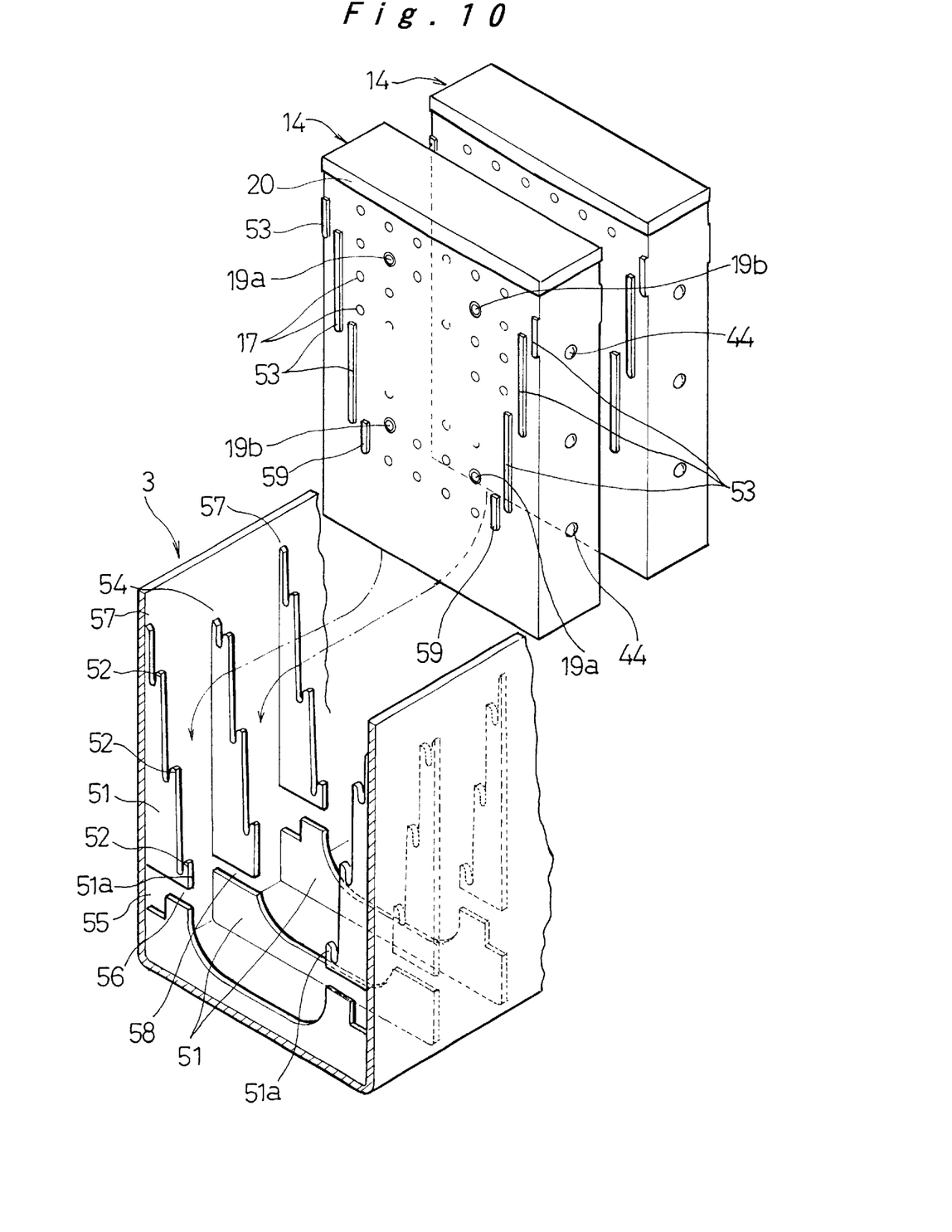
FIG. 10 is an exploded oblique view illustrating the main structure of another embodiment of the sealed battery pack of the present invention.
Figure 11A:
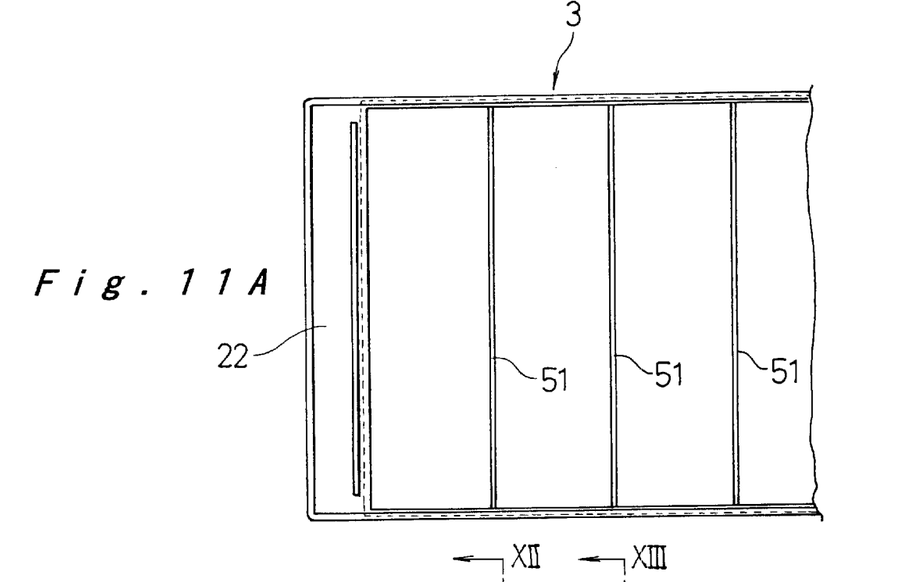
Figure 11B:
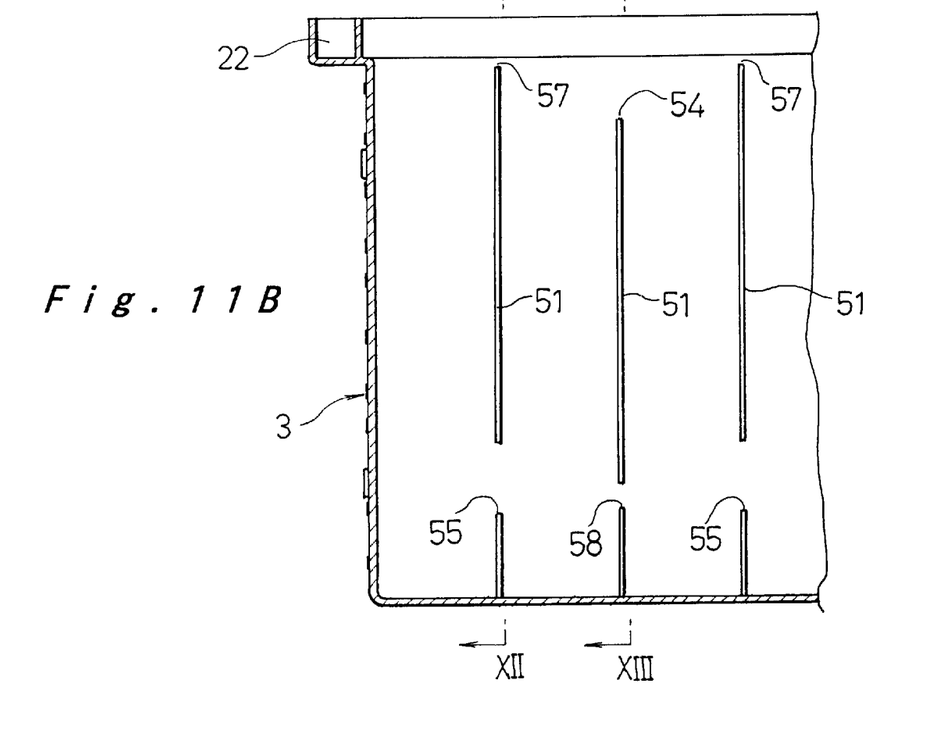
Figure 12:
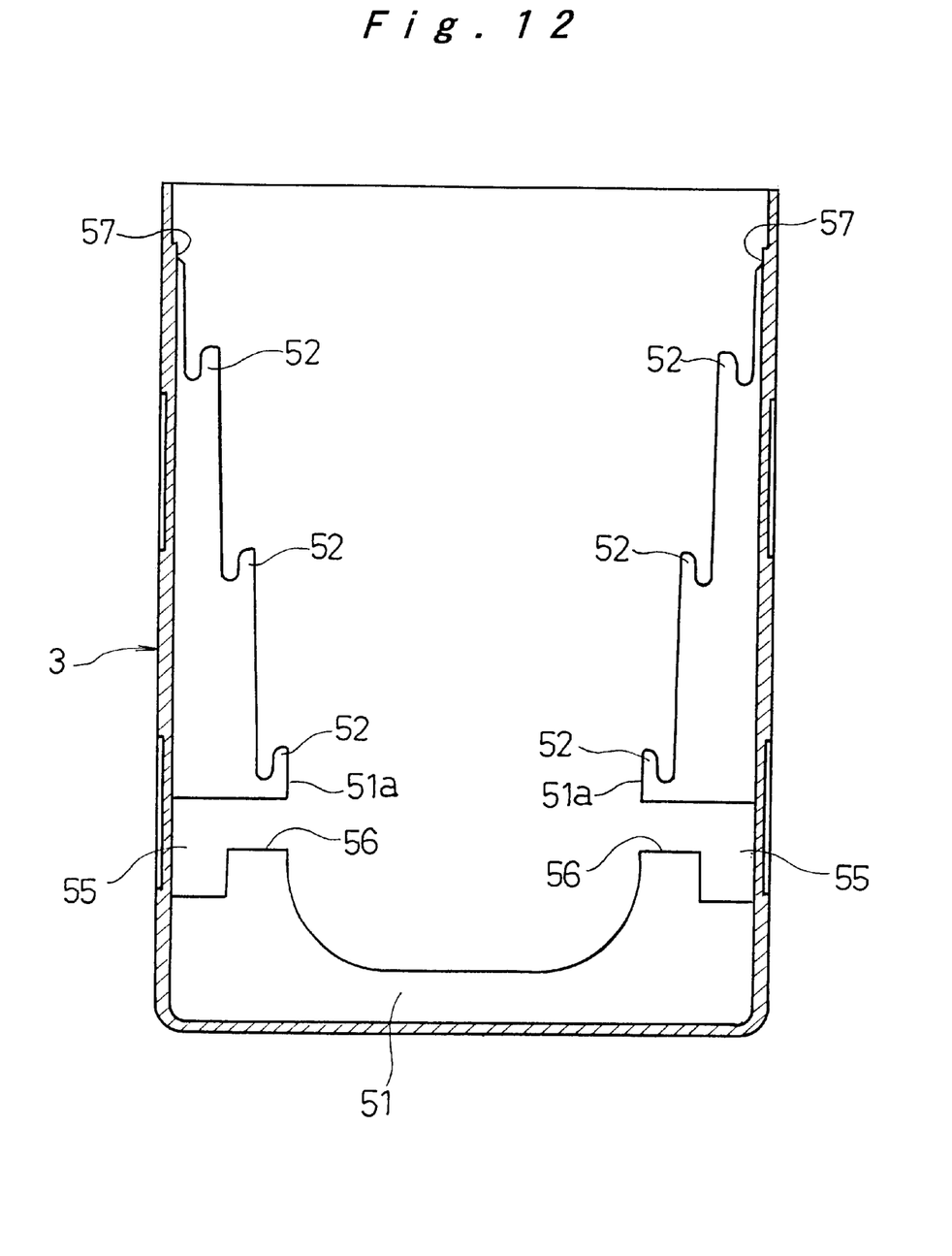
FIG. 12 is a cross section along the XII—XII line in FIG. 11B.
Figure 13:
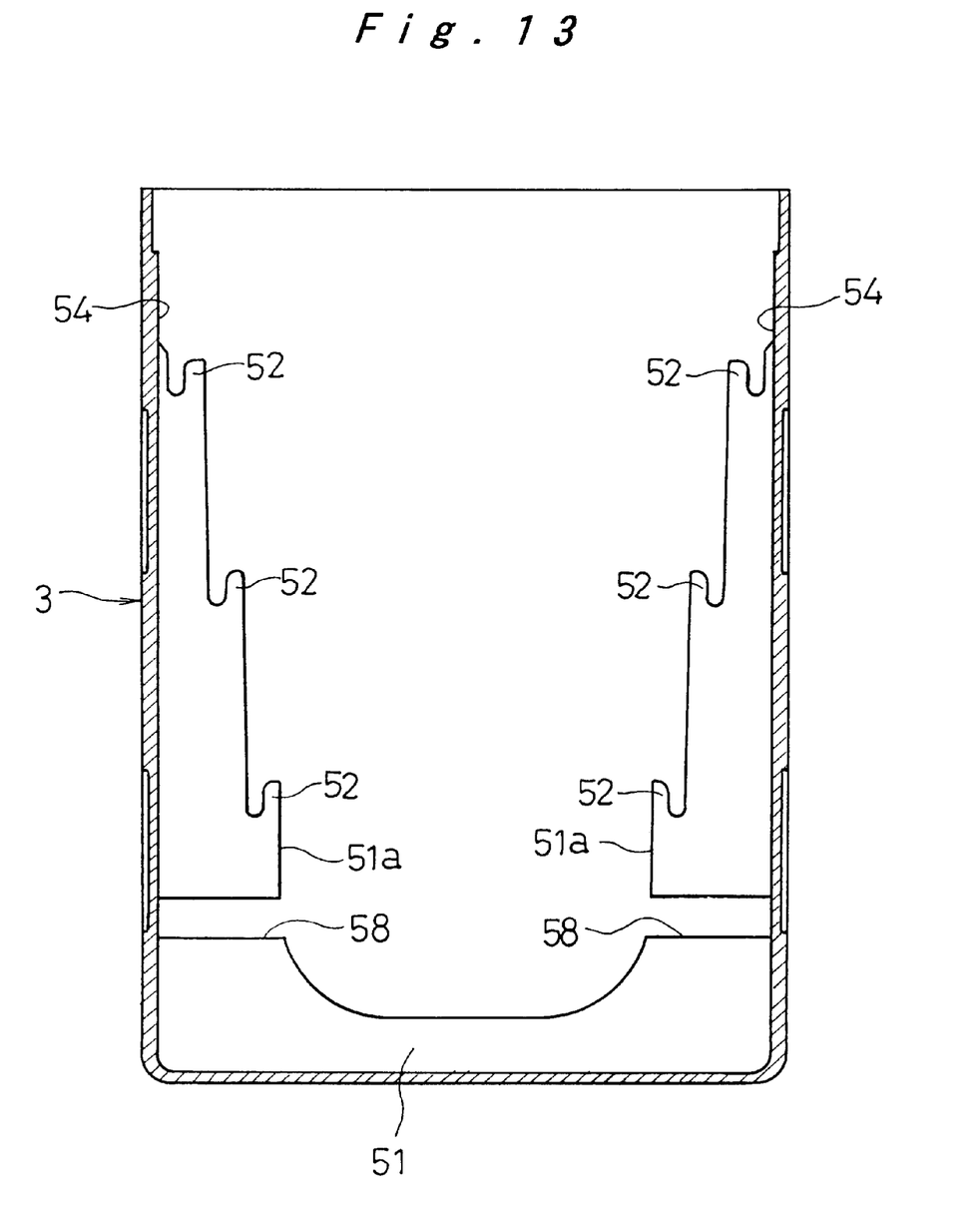
FIG. 13 is a cross section along the XIII—XIII line in FIG. 11B.
Figure 14:
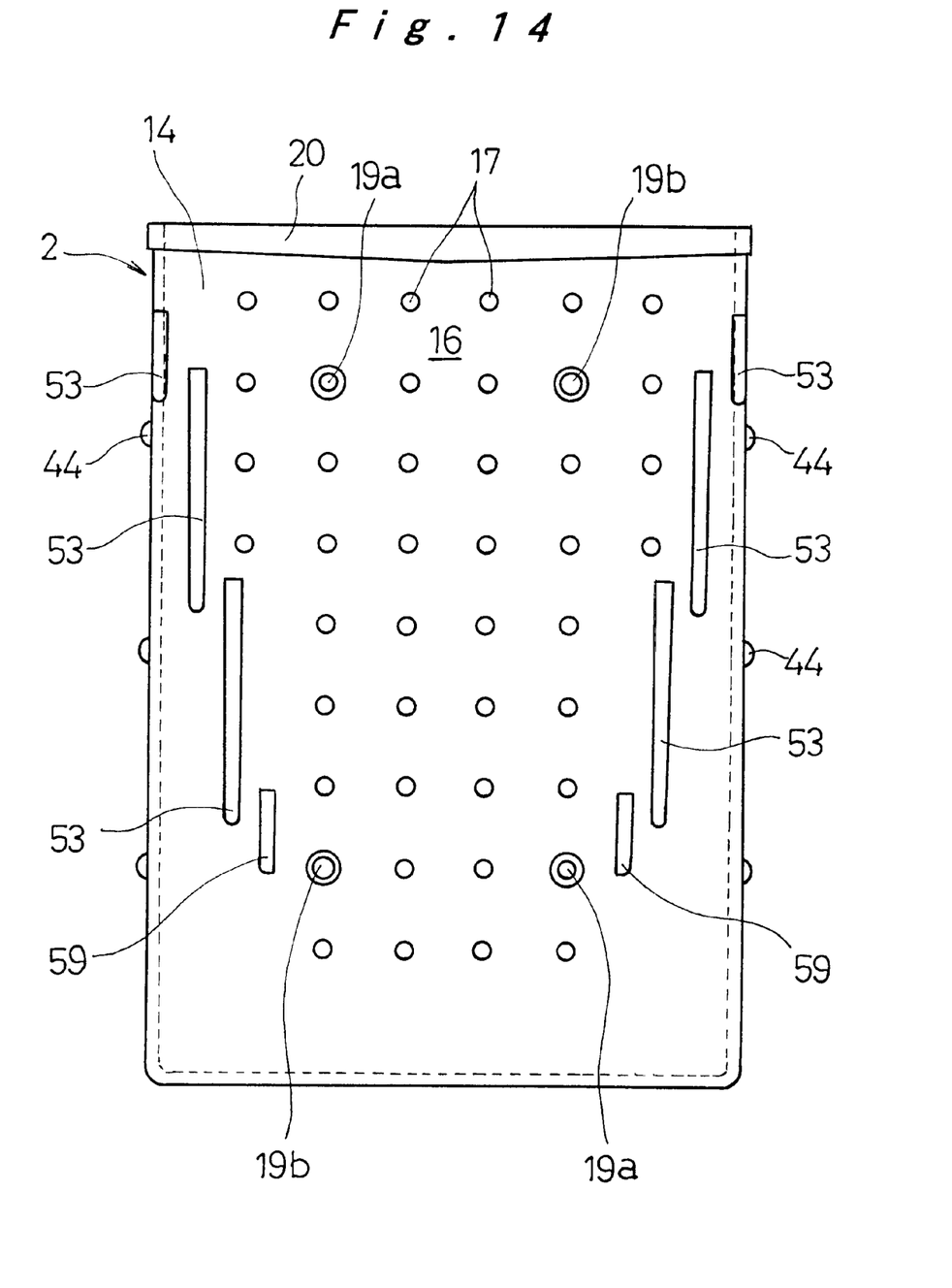
FIG. 14 is a front view of a case in the same embodiment.

In FIGS. 10 and 14, numeral 59 indicates guide ribs provided to the opposing wall surfaces 16 of the cases 14 so as to engage with the bottom inner edges 51a of the step-like partitions 51. In this embodiment, the protrusions 17 provided to the opposing wall surfaces 16 of the cases 14 are only provided to the portions not covered by the step-like partitions 51. Also, spacer ribs 44 are provided at suitable intervals to the side walls of the cases 14 in order to prevent the side walls of the cooling box 3 from being distorted to the inside, which would narrow the coolant passages 21.

With this embodiment, the engagement protrusions 53 and latching members 52 provided at a plurality of places above and below can be engaged without interference merely by inserting the serially disposed cells 2 into the cooling box 3 from above, and the side walls of the cooling box 3 are prevented from being outwardly displaced by the engagement of these engagement protrusions 53 and latching members 52. Therefore, even if the side walls of the cooling box 3 are not welded to the cases 14 of the cells 2, the internal pressure of the coolant passages 21 on both sides will effectively prevent the swelling of the side walls of the cooling box 3. Also, since the latching members 52 and the cooling box 3 are formed integrally, a stabler and stronger joint is obtained than with welding. Also, because the latching members 52 are provided by integrally forming the step-like partitions 51 in the cooling box 3, the mold can be removed from inside the cooling box 3 in a single direction, allowing the mold to have a simpler structure, and making it possible to manufacture the cooling box 3 provided with the latching members 52 at a lower cost.

Figure 15A:
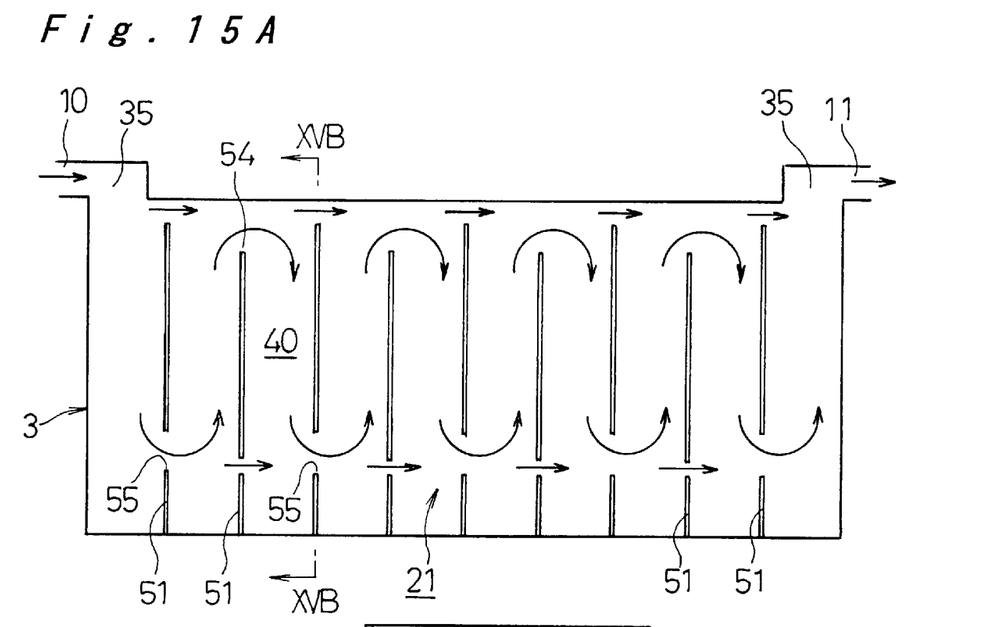
Figure 15B:
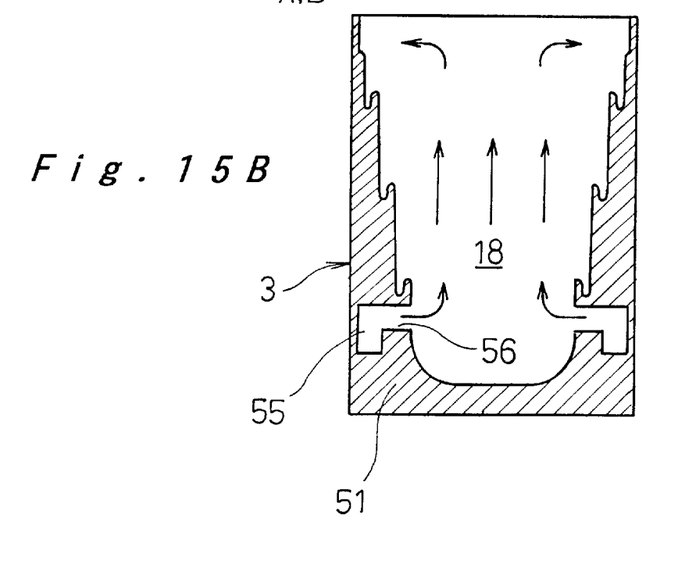

As shown in FIG. 15A, the step-like partitions 51 function as flow-alignment ribs for forming the meandering flow passages 40 in the coolant passages 21 on both sides, and as shown in FIG. 15B, openings on the inside function as the coolant passages 18 between the cases, so all of the side surfaces of the cells 2 can be efficiently cooled with a simple structure merely comprising the provision of the step-like partitions 51 to the cooling box 3.

With the above embodiments, the middle lid 4 was joined to the openings in the cells 2, and the outer lid 5 was joined over this, but the middle lid 4 may be omitted and a single lid joined directly to the openings of the cells 2. Also, the various structural members were integrally joined by welding in the above embodiments, but they may instead be integrally joined by adhesive materials.

As is clear from the above description, with the sealed battery pack of the present invention, a plurality of serially disposed cells are housed in a cooling box, the openings at the top of the cooling box and the openings in the cases of the cells are sealed by an integrating lid, and coolant passages are formed by causing the various cell cases to communicate with each other between the sides of the cells and the inner walls on both sides of the cooling box in the direction in which the cells are disposed, so all of the sides of the cells, including those between the cells, can be forcibly cooled with a coolant that flows through coolant passages, and therefore all of the cells can be effectively cooled and higher performance can be ensured. Also, a coolant passage with a good seal can be formed merely by sealing the tops of the cells with an integrating lid, coolant passages can be formed with a simple sealing and joining process in just the vertical direction with a small number of parts, and a sealed battery pack with high reliability and performance can be obtained inexpensively with less assembly work.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A sealed battery pack wherein a plurality of cells each accommodating therein elements for electromotive force are housed in prismatic cell cases, of which openings are sealed, comprising:

a cooling box with an upper open end for housing the plurality of cells connected in series and arranged in parallel;

an integral lid for sealing the upper open end of the cooling box and the openings of the cell cases;

said integral lid including:
a middle lid which being joined at the bottom thereof to the upper open ends of the cooling box and the cell cases, including a ladder-like framework that separately partitions the openings of the cell cases, and being provided with a plurality of connectors for electrically connecting adjacent cells; and
an outer lid joined to the middle lid on top thereof;
first coolant passages formed between inner walls on both sides of the cooling box in a direction in which the cells are arranged and opposite side walls of the plurality of cells; and
second coolant passages formed between the cell cases of adjacent cells, wherein the first coolant passages and the second coolant passages communicate with each other.

2. A sealed battery pack wherein a plurality of cells each accommodating therein elements for electromotive force are housed in prismatic cell cases, of which openings are sealed, comprising:

a cooling box with an upper open end for housing the plurality of cells connected in series and arranged in parallel;

an integral lid for sealing the upper open end of the cooling box and the openings of the cell cases;

first coolant passages formed between inner walls on both sides of the cooling box in a direction in which the cells are arranged and opposite side walls of the plurality of cells; and second coolant passages formed between the cell cases of adjacent cells, wherein the first coolant passages and the second coolant passages communicate with each other, wherein the first coolant passages and the second coolant passages that communicate with the first coolant passages are formed by means of a plurality of partitions that are formed on the inner walls on both sides of the cooling box in the direction in which the cells are arranged at a pitch space corresponding to the width of each cell, and wherein latching members are formed such as to extend within the second coolant passages between cell cases, protruding from the inner walls of the cooling box on both sides in the cell arrangement direction, and protrusions that engage with the latching members are provided protruding from the cell cases.

3. The sealed battery pack according to claim 2, wherein the partitions on both inner walls of the cooling box are formed with cut-outs in the shape of steps, and the latching members are formed protruding upward from cut-out corners of the partitions.

* * * * *